United States Patent [19]
Lehman et al.

[11] Patent Number: 5,237,172
[45] Date of Patent: Aug. 17, 1993

[54] CALIBRATED COLOR SCANNER WITH REFERENCE LEVEL ADJUSTMENT

[75] Inventors: Richard F. Lehman, Nashua; Roger A. Wendt, Londonderry, both of N.H.; Calvin M. Winey, Carlisle, Mass.

[73] Assignee: Howtek, Inc., Nashua, N.H.

[21] Appl. No.: 937,216

[22] Filed: Aug. 28, 1992

[51] Int. Cl.⁵ .......................... H01J 3/14; H04N 1/40
[52] U.S. Cl. ..................................... 250/235; 358/496
[58] Field of Search ........ 250/235, 234, 236, 214 AG, 250/208.1; 358/446, 463–465, 481, 489, 496, 486

[56] References Cited

U.S. PATENT DOCUMENTS

| | | | |
|---|---|---|---|
| 4,972,273 | 11/1990 | Burkhardt et al. | 358/465 |
| 4,982,294 | 1/1991 | Morton et al. | 358/465 |
| 5,038,225 | 8/1991 | Maeshima | 358/464 |
| 5,103,319 | 4/1992 | Ito et al. | 358/496 |
| 5,105,266 | 4/1992 | Telle | 358/80 |
| 5,105,286 | 4/1992 | Sakurai | 358/464 |
| 5,115,327 | 5/1992 | Ishima | 358/461 |
| 5,185,673 | 2/1993 | Sobol | 358/464 |

*Primary Examiner*—David C. Nelms
*Assistant Examiner*—Michael Messinger
*Attorney, Agent, or Firm*—Cesari and McKenna

[57] ABSTRACT

A rotary color scanner has both linear and logarithmic mode static and dynamic calibration to quickly and automatically calibrate the scanner before each scan, as well as during a given scan, without operator intervention of any kind, whether in the factory or in the field. Close calibration is achieved, despite the use of photomultiplier detectors which are inherently particularly susceptible to drift, and despite the use of high intensity lamps whose output typically varies greatly with aging. The system establishes operation at an optimized data throughput rate up to a limit determined by the maximum scan rate of the system, and thereafter switches to operation at an optimized signal/noise ratio.

28 Claims, 6 Drawing Sheets

CALIBRATED COLOR SCANNER WITH REFERENCE LEVEL ADJUSTMENT

BACKGROUND OF THE INVENTION

A. Field of the Invention

The invention relates to scanners for providing a digitized image of the information in an object such as a letter or a photographic slide and, more particularly, to a color scanner and the calibration therefor.

B. Prior Art

Scanners are used to provide a digitized image of a reflective object such as a letter or a photograph, or a transmissive object such as a slide, etc. Hereinafter, these objects will be referred to collectivley as "documents". Color scanners present a particular challenge to the scanner designer, since it is essential to preserve the relative color values of the original throughout the many stages of processing required to form the desired digital image. In particular, the system electronics inherently includes analog components which are especially susceptible to drift; frequent recalibration is thus essential.

The calibration process itself is frequently complex. Calibration is typically initially performed at the factory, where sophisticated instruments facilitate the process. Even then, because of the unique demands of scanners, particularly color scanners, the process is often time consuming, and thus costly. Further, it is generally necessary to repeat the calibration process throughout the life of the scanner. Typically this is performed at least once at the start of a scanning run, and often is at least semi-automated. However, some systems lose calibration during the scan, and become increasingly unreliable as the scan proceeds. Others are still less than satisfactory when applied to the demanding environment of color scanner calibration.

A major source of error arises from the electro-optic detector system itself. Such systems generally comprise a detector head for receiving light reflected from or transmitted through a document, and for converting that light into electric signals indicative of the intensity of the reflected or transmitted light. The intensity of the reflected or transmitted light that is measured is a function not only of the "true" intensity arising from the characteristics of the image itself, but also from extraneous interference or noise caused primarily by undesired variations in the illumination and in the characteristics of the detector head.

Additional error arises in the electronic processing circuitry that receives the output of the electro-optic detector and converts to a usable output signal, generally in digital form. Such circuitry is subject to electronic noise and drift. The problem is particularly acute when logarithmic processing circuitry is desired because of the wide dynamic range of such circuitry and the inherent ambiguities presented by the circuitry at low light levels which also have high nosie levels.

OBJECTS OF THE INVENTION

A. Objects

Accordingly, it is an object of the invention to provide an improved calibration system for a document scanner.

Further, it is an object of the invention to provide an improved scanner calibration system that is essentially fully automatic and that maintains calibration throughout a scan.

Yet a further object of the invention is to provide an improved color scanner having a calibration system that automatically establishes and maintains color calibration during a scan.

Still a further object of the invention is to provide an improved color scanner that enables both linear and logarithmic signal processing with automatic calibration.

Yet another object of the invention is to provide an improved scanner that optimizes the data throughput rate and the signal/noise ratio of the processing cicrcuitry in complementary regions.

B. Brief Description of the Invention

In accordance with the preferred embodiment of the present invention described herein, a color scanner has a detector system comprising an optical analyzer lens for receiving light from a document and transmitting it to an electro-optic detector which converts the optical input to an electric output for further processing. The document may be of the reflective type (e.g., a letter, a memorandum, a photograph, and the like) or of the transmissive type (e.g., a photographic slide). In the preferred embodiment of the invention as described herein, the electro-optic detector comprises a plurality of photomultiplier tubes, there being three such tubes provided, one for each of the three primary colors red, green, and blue. These tubes typically provide a current output that is proportional to the intensity of light incident upon them, and are capable of operation over a relatively wide dynamic range (commonly on the order of $10^4$). However, they are particularly susceptible to drift, and thus are the subject of color imbalance in the resultant image unless correction is made. Further, the scan electronics itself is inherently susceptible to noise and drift, and thus calibration is essential for precise color work.

The calibration system of the present invention is embodied in a rotary scanner having a transparent cylindrical drum and providing both reflective and transmissive scanning. Further, unlike many systems, the scanner of the present invention provides both linear and logarithmic scan conversion; this greatly increases the versatility of the scanner, but also increases the necessity for accurate calibration.

In accordance with the present invention, first and second reference bands extend in the longitudinal direction (i.e., parallel to the drum axis) on the drum periphery. The first band carries a strip having a highly light-reflective surface on an outer face thereof and a highly light-absorbing surface on an inner face thereof abutting the drum. The second band is clear, i.e., is free of any strip. Essentially, the second band is formed by the wall of the drum. When scanning in reflective mode, the first band serves as a "white" reference, and the second serves as a "black" reference. When scanning in transmissive mode, the roles are reversed, i.e., the second band serves as a "white" reference and the first as a "black" reference.

Two distinct calibrations of the system are performed by the system electronics, both automatically and without operator intervention. The first occurs at the start of each scan, prior to taking data from a document: this is referred to hereinafter as a "pre-scan" calibration. The second is performed as the beginning of each line scan; this is referred to hereinafter as a "line" calibration.

The pre-scan calibration is performed in part with the aid of internal reference standards of precise values. These standards are applied generally in the absence of a detector output in order to calibrate the scan electronics by setting the gain and offset of the electronics to established reference levels. Thereafter, the detector outputs are connected to the electronics, and the scan electronics are recalibrated, using the "white" and "black" reference bands. This is done for both the linear and the logarithmic scanning modes. In addition, the sensitivity of the calibration to changes in gain and offset of the electronics is measured, and the result is used to repeatedly recalibrate the system during line-by-line scanning.

The line calibration monitors the outputs of the black and white reference bands at each scan line and compares them with the values determined in the initial scan calibration. To the extent that they differ, a correction equal in magnitude to the product of the difference and the computed sensitivity is calculated and the gain or offset is changed accordingly to restore calibration. The adjustment is made dynamically, line-by-line, on each of the color processing channels to thereby ensure close color balance.

The present invention incorporates not only linear signal processing, but logarithmic processing as well. This enables ready processing of not only reflective documents such as letters, photographs, and the like, but transmissive documents such as slides and the like. Logarithmic processing presents especial difficulties in calibration because of the wide dynamic range of the signals encountered. Accurate calibration of the "zero" point is particularly a problem, yet is essential when photomultiplier tubes are used as the detectors as in the present invention because of the dark current drift associated with such detectors.

In accordance with the present invention, prescan calibration of the logarithmic signal processing circuitry is accomplished with the aid of internal reference signals which are added to the detector outputs when scanning the "black" reference band. These reference signals are of equal magnitude but opposite sign, and the offset of the signal processing circuitry is repeatedly adjusted until the system provides the same output in response to either signal. Thus, the difficulties of defining the exact "zero" point in logarithmic mode are circumvented.

In contrast to many prior systems, the scanner of the present invention uses tungsten lamps for illumination. Such lamps are comparatively inexpensive, but their light output is sufficiently variable as to render them generally undesirable for color scanning unless rather elaborate steps are taken to compensate for their characteristics and to maintain an effectively constant output. In accordance with the present invention, however, no attempt is made to control the intensity of the illuminating source. Instead, a separate power supply, with separate voltage adjustments, is used for each detector. This allows optimization of the signal/noise ratio for each detector, and contributes significantly to system performance. During the pre-scan calibration, as the white reference band is scanned, the high voltages applied to each of the photomultiplier tubes are separately adjusted so that the output of the signal processing circuitry is at or near a defined reference output level corresponding to the "white" level. Fine adjustments of this output level are then made in the electronics circuitry if necessary. Thus, regardless of changes which occur in the intensity of the illuminating source over time, the system is brought to the same reference level at the start of each document scan.

In mixed analog/digital systems such as the present, analog-to-digital converters are an essential element. Such converters are costly, particularly if converters of the relatively high accuracy required for quality color processing are used. Thus, it is desirable to operate such converters as close to their maximum data rate as is feasible, without exceeding that rate. This is typically difficult to accomplish in document scanning systems which allow a variety of scanning speeds and resolutions such as the present system. However, this is accomplished in the present invention by adjusting the resolution and the drum rotational speed to maintain a constant data rate through the system over a wide range of speeds and resolutions. Further, in accordance with the present invention, outside this range, the signal/noise ratio of the processing circuitry is adjusted in order to further optimize system performance. This not only optimizes the utilization of the analog-to-digital converter, but also enhances the signal-to-noise ratio of the system.

In particular, the data rate, DR, is directly proportional to the scan resolution, R, and the rotational speed, S, of the drum on which the document is mounted, i.e.

$$DR = a*R*S$$

where a is a constant whose magnitude is dependent on the drum diameter and speed, as well as the units in which the resolution and drum speed are measured, and * denotes multiplication. In the preferred embodiment described herein, with R measured in dots per inch ("dpi") and S in revolutions per minute ("rpm"), and with a drum approximately 4 inches in diameter, a is 5/24. This gives a data rate of 250,000 kHz. when operating in the region of maximum data rate.

Further in accordance with the present invention, the detector output is integrated over a period that is inversely related to the data rate, while the output of the integrator is maintained at a constant level in response to a given reference signal by adjusting the gain of the integrator circuit as necessary, despite differences in the data rate. In particular, the integration time is given by $$t_i = (b/DR)*t_c$$

where $t_i$ is the integration time in nanoseconds, $t_c$ is the system clock period in nanoseconds, and b is a constant whose magnitude is dependent on the units used. For the units here described, and with a system clock period of 125 nanoseconds, b equals 8.

In accordance with the present invention, in a first operating range, comprising resolutions ranging from 4000 dpi down to 1000 dpi and rotational speeds varying from 300 rpm up to 1200 rpm, the data rate is constant at 250,000 Hz, and the integration time is also kept constant. This provides maximum data throughput consistent with the capabilities of the analog to digital converters used in the signal processing circuitry, while providing an acceptable signal/noise ratio. Outside this range, the drum speed is kept at its maximum (1200 rpm) and the resolution further decreased. This provides a data rate less than the maximum, but enables the attainment of substantially greater signal/noise ratios.

DETAILED DESCRIPTION OF THE INVENTION

The foregoing and other and further objects and features of the invention will be more readily understood from the following detailed description of the invention, when taken in conjunction with the accompanying drawings, in which:

FIGS. 1 and 1A are an overall block diagram of a rotary scanner showing components thereof of interest in connection with the present invention;

In FIG. 1, a transparent rotary, thin-walled drum 10 on which a document 12 is mounted for scanning is illuminated by either a first light source 14 exterior to the drum (in the case of reflection scanning) or by a second light source 16 interior to the drum (in the case of transmission scanning). The light sources illuminate a defined spot 18 on the document, and the reflected or transmitted light from this spot is imaged by a lens 20 and transmitted to an electro-optic detector 22 for processing by a signal processing circuitry 24. A power supply 26 (which, as described more fully below, in fact comprises one independently adjustable supply for each color to be scanned) supplies the requisite power for the detector 22.

Figures 1A, 1B:
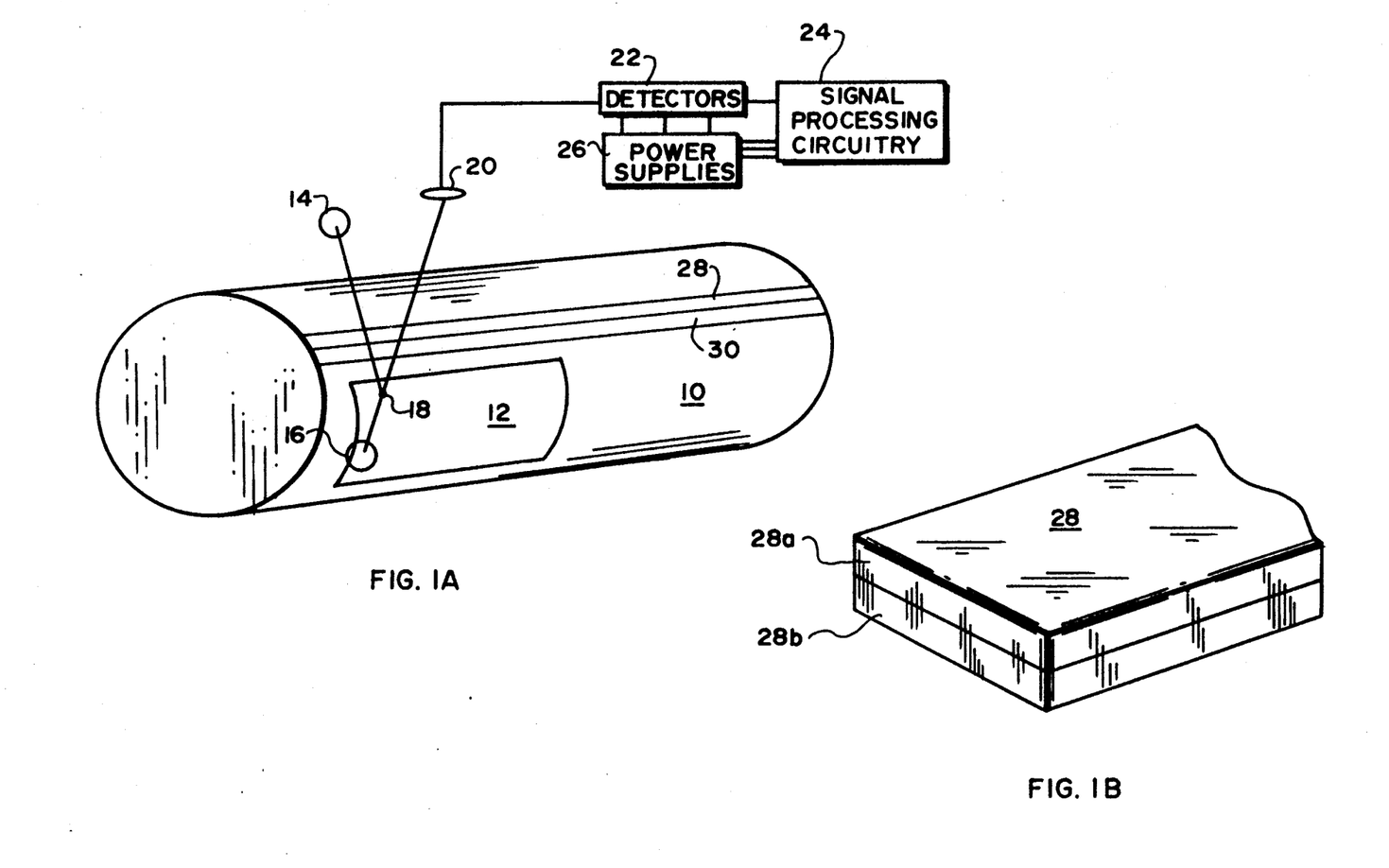

The drum 10 carries first and second calibration bands 28 and 30, respectively. These bands extend longitudinally, preferably along at least the full extent of the scanning area, and extend circumferentially only a limited distance, e.g., on the order of 5–10% of the circumference. As shown in FIG. 1A, band 28 carries on it a calibration strip having an upwardly-facing highly light-reflective surface 28a, and a downwardly-facing highly light-absorbent surface 28b. Band 30 is unobstructed, i.e., it simply comprises the wall of the drum 10 in this area.

For reflection scanning, the upper face of band 28 serves as a "white" reference, and band 30 serves as a "black" reference. As band 28 rotates into the field of view of the lens 20, light from source 14 is reflected from the band into the lens 20 because of the highly reflective surface 28a, and is thence is passed to the detector for processing. However, as band 30 rotates into the field of view of lens 20, very little of the light incident on it is reflected back into the lens. Instead, most of the light incident on it is transmitted through the drum, and thus provides no input to lens 20.

For transmission scanning, the functions of bands 28 and 30 are interchanged, i.e., band 30 passes nearly all the light emitted by transmission illumination source 16 and thus this band serves as a "white" reference source in the transmission mode of operation, while band 28 passes essentially none of the light from source 16 and thus this band serves as a "black" reference source in this mode.

In accordance with the present invention, the detector 22 is formed from a group of photomultiplier tubes, one for each of the colors red, green and blue that are to be detected by the scanner. Similarly, the power supply 26 comprises a corresponding number of independently adjustable high voltage supplies whose outputs are adjustable in accordance with control signals applied to them from signal processing circuit 24. The power supply control signals are generated in response to scanning the calibration bands 28 and 30 and cause the voltage applied to the corresponding photomultiplier tubes (and thus the gain of these tubes) to vary in such manner as to provide a "white" and a "black" reference output as the output of the signal processing circuitry 24 when the "white" and "black"0 reference bands are scanned.

Figure 2:
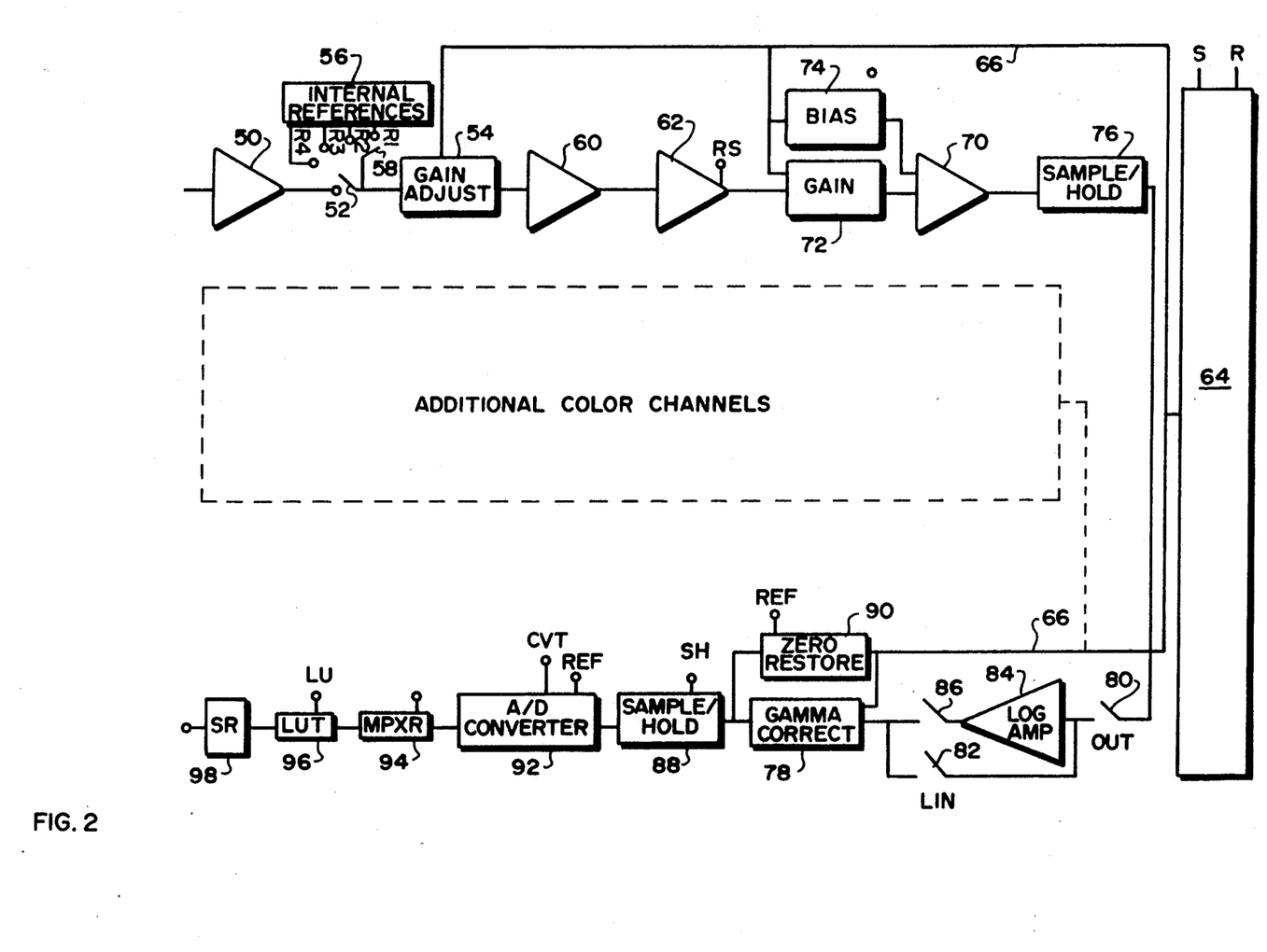
FIG. 2 is a detailed block and line diagram illustrating the calibration system of the present invention.

This will be understood more fully on reference to FIG. 2 which shows the signal processing circuitry in more detail. For ease of explanation, only a single color signal channel will be shown; however, it will be understood that there is provided one channel for each color to be processed, the remaining channels being essentially identical to that shown. In FIG. 2, an amplifier 50 receives the output of one of the photomultipliers 22. The output of amplifier 50 is applied through a switch 52 to a gain adjuster circuit 54. A plurality of precision reference signals R1–R4 from a source 56 are also applied to circuit 54 through a switch 58. In the preferred embodiment, the signals from source 56 are currents whose magnitude equals $10^{-6}$, $10^{-7}$, and $+-10^{-8}$ amperes, respectively. They allow precise setting of the "white" and "black" levels to correspond to photographic white and black when operating in a linear conversion mode, as well as providing for calibration when operating in the logarithmic conversion mode.

The system is capable of operating at a number of different drum speeds and resolutions (the latter being commonly expressed in "dots-per-inch" or "dpi"). Each combination of drum speed and resolution defines a sampling time over which one value (for each color) of the scanned data will be collected. In accordance with the present invention, the bandwidth of the detection circuitry electronics is adjusted in accordance with the selected scanning speed and the selected resolution to thereby minimize the noise of the system.

This is accomplished by means of gain adjuster 54, an amplifier 60, and an integrator 62. Adjuster 54 may advantageously comprise a resistive network whose "gain" is varied in accordance with digital command inputs applied to it. In the present invention, it is implemented in the form of a digital-to-analog converter which receives a digital count from a central controller 64 via a bus 66. The count is a function of the selected drum speed S and the selected scan resolution R which are supplied to the controller 64 by the scanner system in accordance with the operator settings. Controller 64 in turn converts these inputs to a digital count for application to the adjuster 54 which is thereby set so as to provide a fixed signal output level at the output of integrator 62 at the end of its integration period in response to presentation of a standard reference signal, such as a "white" reference signal, at the input to the integrator. Controller 64 also responds to the resolution and drum speed input signals R and S to select the integration time of the integrator 62. This is accomplished by means of a reset signal, RS, which is applied to integrator 62 from controller 64 and the end of the desired integration time.

The gain of the gain adjuster 54 and the integration time of the integrator 62 are set in a coordinated fashion. In particular, in the preferred embodiment of the invention, as noted previously, the rate at which data is being passed through the system is given by DR=a*R*S, where R is the chosen resolution (ranging from as high as 4000 dpi to as low as hundreds of dpi) and S is the drum speed (ranging from a few hundred rpm to as high as 1200 rpm in the particular embodiment described here) and a is a constant. The integration period is then $t^i=(b/DR)*t^c$, where b is a further constant and $t^c$ is the system clock period, here, 125 nanoseconds. For a given resolution and scan rate, the gain of adjuster 54 is set to provide the desired standard output at the end of the integration period. For example, at a resolution of 4000 dpi and a drum speed of 300 rpm, a count of 32 was generated by the controller to reset the integrator after an integration time of 32*125=4000 ns. The same count was also used to set the gain of the bandwidth adjuster 54 so that the output of the integrator was at its maximum ("white reference") level at the time integration ceased.

This arrangement maximizes the signal-to-noise ratio of the system, and contributes to excellent color and detail capture. It also enables the use of high data rates at high resolutions to thereby take maximum advantage of the conversion capabilities of the analog-to-digital converters in the system. The high data rate is maintained over a wide range of resolutions and, for a given converter capability is otherwise limited only by the limit on scanning speed imposed by the drum capabilities. For example, with a drum of nearly 4 inches in diameter, a data rate of 250 kHz (kilohertz) was achieved at a resolution of 4000 dpi and a drum speed of 300 rpm, as well as at a resolution of 1000 dpi and a drum speed of 1200 rpm.

The output of integrator 62 is applied to a variable gain/variable bias amplifier 70 whose gain and bias are controlled responsive to gain and bias adjustment digital-to-analog converters 72 and 74, respectively. These converters receive digital data from the controller 64 via bus 66. As was the case with gain adjuster 54, the converters 72, 74 advantageously comprise resistor networks responsive to the data from bus 66 to set their resistance value to a desired level and thereby control the gain of the signals passing through them. In combination with the amplifier 70, the converters 72 and 74 effectively form a variable-gain, variable-bias amplifier: the converter 64 sets the "white" level or system "gain" for a scan, while the converter 66 sets the "black" level or system "bias".

In particular, as the "white" portions of the calibration bands 28, 30 pass under the analyzer lens 20, the illumination is repeatedly measured, the measurements are averaged, and the resultant average is used to set the gain of the amplifier 70 to its maximum level corresponding to the white level. The same procedure is repeated as the black portion of the calibration bands pass under the analyzer lens, and the gain of the amplifier is thereupon set to its minimum or "black" level.

The circuitry described so far is replicated once for each color to be processed, and the replicated circuitry is operated in parallel to provide the desired calibrated data for the respective colors. Up to this point also, the circuitry operates in linear mode. At this point, the data is ready for logarithmic conversion, if desired, as well as for gamma and other correction. In particular, the output of amplifier 70 is applied to a sample and hold circuit 76, and thence to a gamma corrector 78 either directly via a switch 80 and bypass switch 82 or indirectly via switch 80, a logarithmic amplifier 84, and a switch 86. Switch 80 is closed on receipt of a control signal OUT from the controller to thereby pass the output of the selected sample and hold circuit to the switch terminal 80a. At the same time, one of either switch 82 or switch 86 is closed in response to a control signal LIN or its complement, respectively, from the controller to pass the output of sample and hold 70 either directly to the gamma corrector 78 (when switch 82 is closed) or indirectly to the gamma corrector via the amplifier 84 (when switch 86 is closed). In the latter case, the signal undergoes logarithmic conversion. In the specific embodiment of the present invention, the amplifier 84 operates over a 4-decade range to provide a significant conversion range.

Gamma corrector 78 enables modification of the slope ("gamma" or "gain") of the image input/output signal. It responds to a digital count that is supplied to it from controller 64 via bus 66 to vary the gain of signals applied to it through either switch 82 or 86 and is calibrated when the circuit is operated in logartihmic mode, as described more fully below. The output of corrector 78 is applied to a sample and hold circuit 88, together with the output of a zero restorer or offset circuit 90. The restorer 90 is loaded with a digital count from controller 64 via bus 66 to set the "offset" of the logartihmic conversion in connection with a reference signal REF applied to it.

At this point, the processed signal is ready for final conversion to digital form. This is accomplished by means of sample and hold circuit 88 which samples its input signal on receipt of a timing command SH from controller 64 and passes it to an analog to digital converter 92. Converter 92 is activated on receipt of a timing signal CVT from controller 64, and is supplied with a reference signal AREF. A multiplexer 94 recieves the resultant digital signal and supplies it to a lookup table 96 under control of a timing signal LU from the controller. The table 96 in response supplies a digital word corresponding to the input signal to a shift register 98 where the resultant digital word is stored for subsequent use.

Calibration is performed for each channel (i.e., for each color), beginning with the linear mode of operation. This mode is commonly used for reflective scanning, where the density variations of the document being scanned are generally more limited than in transmission mode (e.g., typically a dynamic range of $10^2$ in linear mode, versus a range of $10^4$ in logarithmic mode). An initial or pre-scan calibration is performed each time the scanner is turned on, or whenever requested by the user, and prior to scanning. A continuing or line-by-line calibration is performed at the start of each scan line during scanning.

Refer now to FIGS. 3–6, in which the calibration steps are numbered in correspondence with the following discussion. The calibration commences with linear calibration of the signal processing circuitry from internal reference standards, then proceeds to linear calibration with the photodetectors in circuit, then continues to logartihmic calibration.

Figure 3:
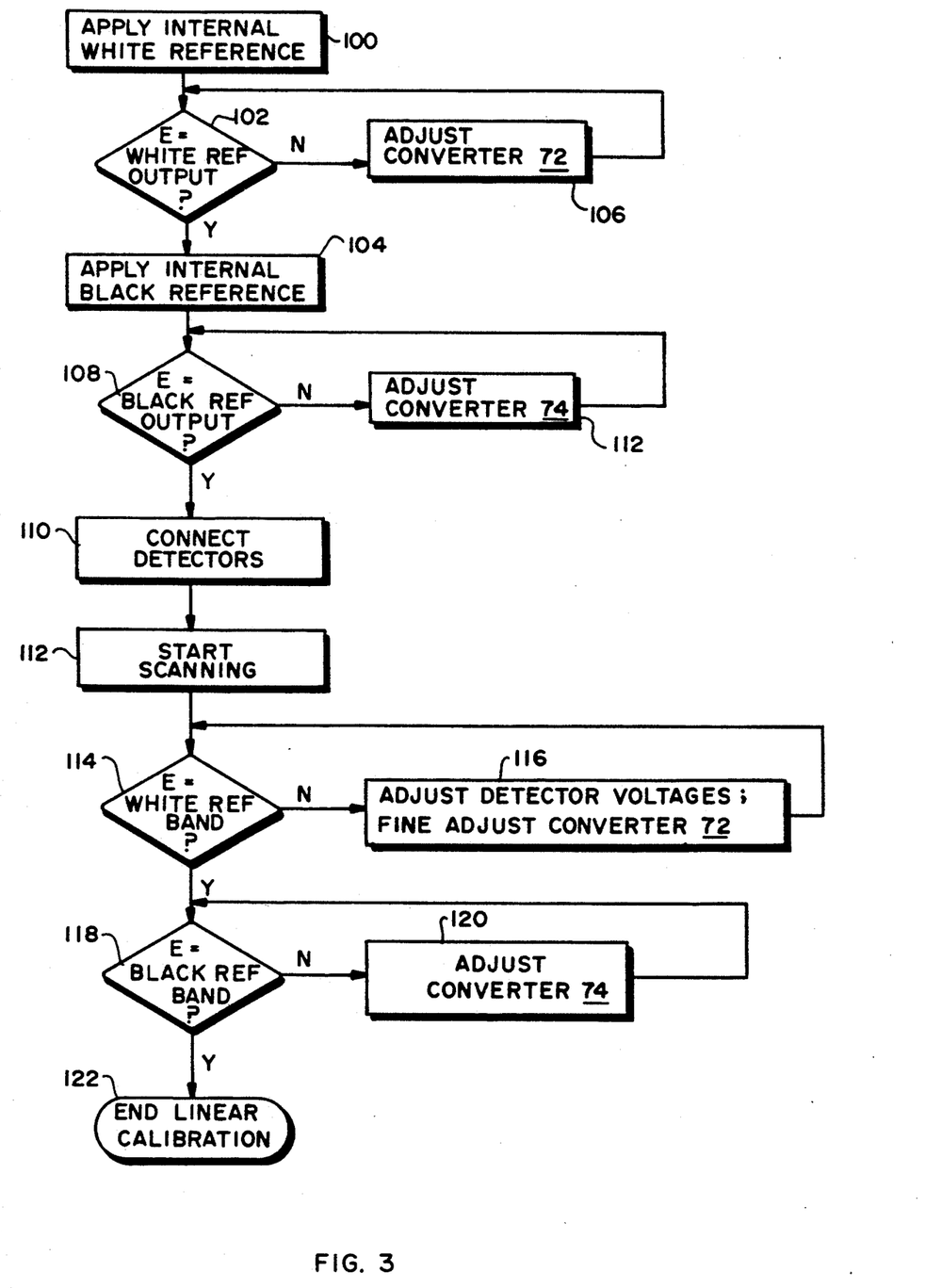
FIG. 3 is a flow diagram showing the linear calibration flow control.

In FIG. 3, to begin the initial calibration, the controller first applies to the circuitry commencing with gain adjuster 54 an internal reference R1 which sets the gain of the linear circuit (100). The controller accomplishes this by opening switch 52 so that the detector is disconnected, and setting switch 58 select reference signal, R1, for connection to the gain adjuster 54. The output of adjuster 54 is then applied to the preamp 60 and thence to integrator 62. After the established integration interval corresponding to the selected resolution and drum speed, the output of the integrator is sampled in sample and hold circuit 76. Switch 80 is closed, as is switch 82, and the contents of shift register 98 are examined by the controller to determine whether they correspond to a first reference output level corresponding to the color "white", e.g., the equivalent of one volt (102). If the output E° of register 98 has the desired value, the controller proceeds to the next step of the calibration procedure, namely, setting the zero point or bias (104). If, however, the output of register 98 is anything other than the desired standard value, the controller leaves switch 52 connected to reference source R1; loads a modified proposed gain value into the gain converter 72 (106); and again checks the output of register 98 for conformance to the desired standard output (102). This process is repeated until the desired output is obtained. A variety of algorithms may be used to set the value of the trial gains used during the calibration. We have found that a binary search provides rapid convergence and have structured the system accordingly.

The system bias is set in a similar manner, namely, the controller sets switch 52 to a reference value R3 corresponding to the desired "black" output, (104) and examines the output of register 98 to determine whether this produces the desired second standard output (108). If it does, the controller proceeds to the next step, namely, calibration with the photomultiplier detectors in the circuit (110). If the output is not the desired output, the controller loads a modified proposed bias value into the offset converter 74 (112) and proceeds to check and adjust the value as previously until the desired output is achieved.

Next, the controller switches the photomultiplier tubes "in circuit", i.e., connects them into the signal processing circuitry via switch 52 (110). The controller starts drum scanning (114) and examines the output of register 98 during scanning of the white calibration band 28 (114). If the output E° of register 98 is not at a level corresponding to the maximum (white) level of the system, the controller changes the high voltage supplied to the photomultiplier detector tubes (116) and retests the output of register 98 (114) until the output is at or near the desired level during scanning of the white calibration strip. Final (fine) adjustment of this value may be made by readjusting the gain converter 72.

The next step in the initial linear calibration involves setting the black level, again with the photomultiplier tubes in circuit. To accomplish this, the controller examines the output of register 98 and looks for a minimum value corresponding to maximum black (118). If the output is not at the desired level, the controller modifies the value in bias converter 74 and reexamines the output of register 98 (120). This process is repeated until the desired output is achieved. At this point, the linear calibration of the scan calibration is complete (122).

Figure 4:
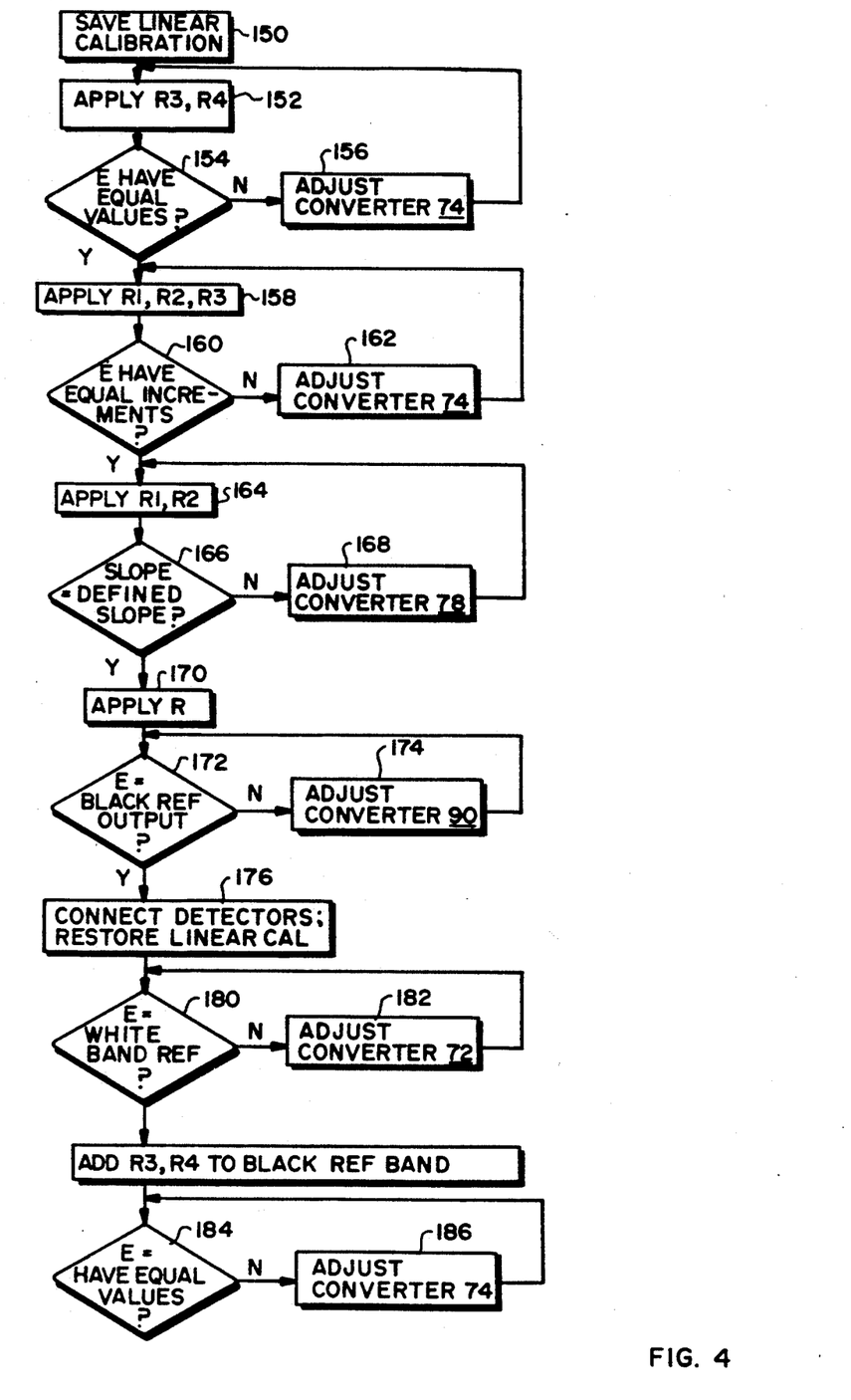
FIG. 4 is a flow diagram showing logarithmic calibration flow control.

The system is now ready for logarithmic calibration, as shown in FIG. 4. To begin this, the linear gain and bias values are stored (150) for subsequent use. The system is then switched to logarithmic mode (i.e., switch 86 is closed and switch 82 is opened). The bias of the system is adjusted first. In the linear portion of the system, only a single reference signal, corresponding to the minimum or "black" signal level, is needed to adjust the bias. If this same approach is taken with the logarithmic portion, however, it will be found that the low signal-to-noise ratio at the black level region prevents effective calibration. Further, because the logarithmic amplifier is sign insensitive, i.e., input signals of the same magnitude but opposite sign will give the same output, the sign of the bias correction to be added at the input may become indeterminate. In accordance with the present invention, this problem is avoided by applying two distinct reference signals of equal magnitude but opposite sign at a level somewhat above the black level and adjusting the system to obtain the same output in response to the two. Because of the symmetry of the response to positive and negative inputs, this ensures that the black level is correctly set. (In particular, reference signals R3 and R4 = −R3 are alternately applied to converter 54 (152) and the resultant outputs of register 98 compared (154). If the outputs are not the same for both R3 and R4, bias converter 74 is repeatedly adjusted (156) until the bias signal supplied by it to amplifier 70 causes the corresponding outputs in register 98 to converge to within an acceptable error band.

Next, reference signals R1, R2, and R3 are applied (158) and differences in the output corresponding to these (i.e., the output corresponding to (R2−R1) and (R3−R2)) is stored (158). Converter 74 is then repeatedly adjusted (160, 162) to bring these differences to within an acceptable limit. Thereafter, references R1 (corresponding to the standard white level) and R2 (corresponding to a level on the order of one-tenth of this) are alternately applied (164) and the system output is compared to the desired standard output value for this reference (166). The gamma (or gain) corrector converter 78 is adjusted (168) as necessary to bring the system output to the desired standard values in response to these two signals. Similarly, reference R1 (corresponding to the standard white level) is applied and the system output is compared to the desired standard output value for this reference (172); zero restorer or offset converter 90 is adjusted as necessary (174) until the desired standard output for the reference input is attained to within an acceptable error level.

The detector element is now switched back into the Circuit (176) and the linear calibration values that were earlier determined are restored into the converters 72, 74 (178). The standard output for "white" is then again examined (180) and the converter 72 finally adjusted again as necessary to bring the system output to the desired value (182). Before rechecking the black band value, the black level internal reference signals R3, R4 are alternately added in via switch 58 (FIG. 2) and the output E° of register 98 is checked (184) to verify that the outputs are equal. If not, the bias converter 74 is repeatedly adjusted (186) until the desired output is obtained. The logarithmic scan calibration is now complete.

Figure 5:
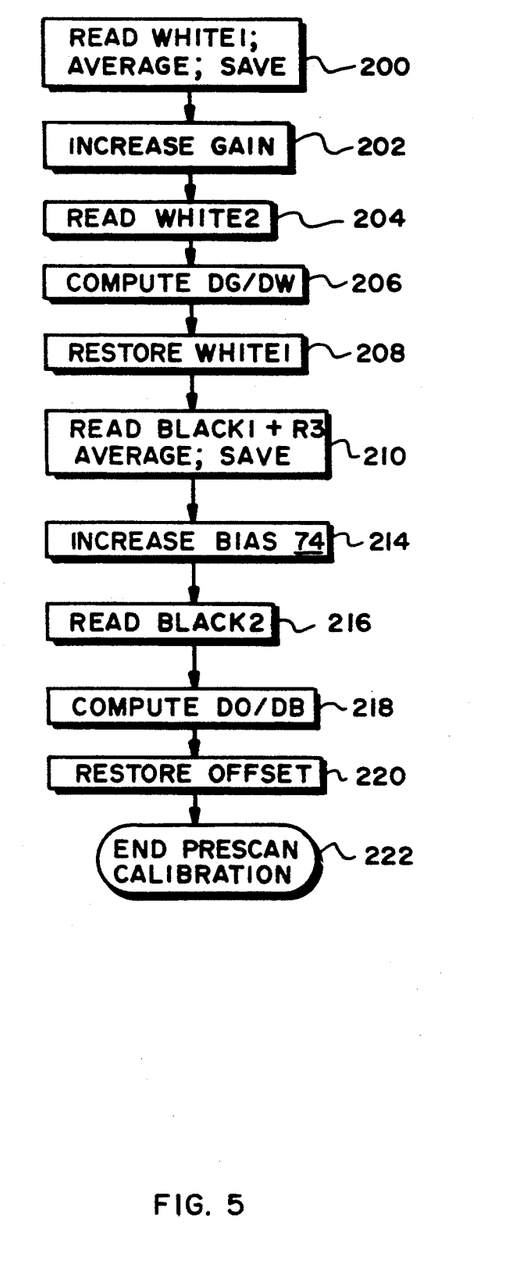
FIG. 5 is a flow diagram illustrating calibration measurements in preparation for line-by-line calibration.

The final step in scan calibration is to determine the sensitivity of changes in the output to small changes in the gain and bias. This information is used to provide line-by-line calibration during a scan. Referring to FIG. 5, the controller first causes a scan of the white reference strip; averages the output signals over a defined time interval; and saves the resultant output value "WHITE1" of register 98 (200). Next, it varies the setting of the gain converter 72 by a slight amount (202) and again reads and averages the output "WHITE2" of the white reference band over a defined interval (204). Using these two values, the controller calculates the change DW of the output in response to a small change in the gain, DG. The ratio DG/DW of the two is the "white" or gain sensitivity of the system.

The controller next restores the original white reference value (208) and causes a scan of the black reference band (210). In order to avoid the low signal-to-noise area in the black region, particularly when operating in the logarithmic mode, a low level reference signal, R3, is added to the detector output and the resultant composite signal "Black1"+R3 is averaged over a defined time interval and stored (210). Next, the bias value of converter 74 is increased by a small amount (214) and the black reference band output "BLACK2" again measured (216). The change DB of the system output in response to the change DO of the bias is then determined (218); the ratio DO/DB of the two is the "black or bias sensitivity" of the system.

At this point, the system is ready for scanning a document line by line to form a digital image of the document. In order to ensure that the system remains in calibration during the line scanning, the controller reads the "white", "black1+R3" and "black" calibration bands at the start of each line scan, compares the resultant output with the stored calibration values, and adjusts the gain and bias converters 72, 74 in accordance with the differences.

Figure 6:
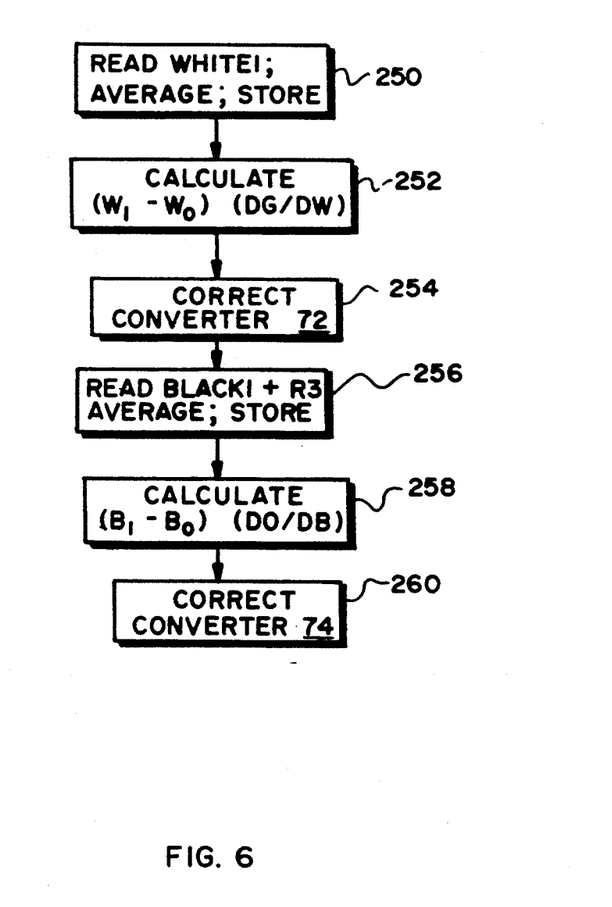
FIG. 6 is a flow diagram illustrating line-by-line calibration.

Specifically, referring to FIG. 6, the controller reads the white calibration band, averages it over a defined time interval, and temporarily saves the result (250). It then determines the difference between the resultant system output $W_1$ and the stored calibration value $W_0$ obtained in the scan calibration step, and multiplies this difference by the white sensitivity, i.e., by DW/DG (252). The resultant correction, dG, is added to the converter 72 to set this establish the requisite correction for the data that follows on the scan line.

Similarly, the controller reads the black calibration band, averages it over a defined time interval, and temporarily saves the result (256). It then determines the difference between the resultant system output $B_1$ and the stored calibration value $B_0$ obtained in the scan calibration step (256), and multiplies this difference by the reciprocal of the black bias or offset sensitivity, i.e., by DB/DO (258). The resultant correction, dB, is added to the converter 74 (260) to establish the requisite offset correction for the data that follows on the scan line. These calibration adjustments are made for each line.

CONCLUSION

From the foregoing it will be seen that we have provided an improved scanner that is quickly and reliably calibrated both statically and dynamically despite the use of inherently time-varying components such as photomultiplier tube detectors and high intensity lamps. The calibration is rapid and automatic, and requires no operator intervention, whether at the factory in initial manufacture or in the field in use. The calibration is performed before each scan, and is continuously updated on a line-by-line basis during a given scan so as to maintain the requisite color balance control that is critical to fine color work. The system makes optimal use of its data capacity within a defined region, and maximizes signal/noise outside that region.

It will be understood that the foregoing has described an illustrative embodiment only, and that various changes may be made therein without departing from either the spirit or the scope of the invention, the invention being defined with particularity in the claims appended hereto.

What is claimed is:

1. A self-calibrating document scanner, comprising
   A. a detector for generating electric signals indicative of information in a document
   B. signal processing circuitry connected to receive said detector signals as input and convert said signals to digital form as output for subsequent utilization, said circuitry including first and second adjustment elements for adjusting input-output transfer characteristics of said circuitry,
   C. means for applying to said signal processing circuitry, in place of said detector signals, first and second internal reference signals, respectively, said signals indicative of first and second reference output levels and driving said circuitry to first and second nominal output levels, respectively,
   D. means responsive to said nominal output levels for repeatedly varying said adjustment elements until said circuitry provides said first and second reference output levels, respectively.

2. A document scanner according to claim 1 in which said first adjustment element varies the gain of said processing circuitry.

3. A document scanner according to claim 1 in which said second adjustment element varies the offset of said processing circuitry.

4. A document scanner according to claim 1 in which said adjustment elements comprise analog signal transfer elements having at least input terminals and output terminals and responsive to digital signals applied thereto to vary the signal gain between said input and output terminals.

5. A document scanner according to claim 1 in which said adjustment elements comprise analog signal transfer elements having at least input terminals and output terminals and responsive to digital signals applied thereto to vary the signal offset between said input and output terminals.

6. A document scanner according to either claim 4 or 5 in which said adjustment elements comprise digital-to-analog converters.

7. A document scanner according to claim 1 which includes an amplifier connected to receive inputs from said adjustment elements and providing, in conjunction with said elements, a controllable-gain, controllable-offset amplifier.

8. A document scanner according to claim 7 in which said adjustment elements comprise a first element connected to an amplifying input of said amplifier and a second element connected to an offset-adjusting input of said amplifier, the gain of said first and second elements being adjustable in response to a digital signal applied thereto.

9. A document scanner according to claim 8 in which said adjustment elements are connected to receive digital words indicative of the gain to which said elements are to be set.

10. A document scanner according to claim 1 in which the means for varying said adjustment elements includes a controller for determining the difference between said nominal output levels and said reference output levels and applying to said adjustment elements digital signals indicative of said difference.

11. A document scanner according to claim 1 including (1) means for connecting said detector to said circuitry after said adjustment elements have been adjusted,
(2) a first reference band for generating a first reference band output when said band is scanned with said detector,
(3) means for adjusting said detector to vary the output thereof in response to an input to drive said first reference band output toward a first reference band reference output in response to scanning said first reference band,
(4) a second reference band for generating a second reference band output when said band is scanned with said detector,
(5) means for adjusting one of said adjustment elements to drive said second reference band output toward a second reference band reference output in response to scanning said second reference band.

12. A document scanner according to claim 11 in which said detector comprises a photomultiplier tube connected to a voltage supply and in which the means for adjusting said detector includes means for varying the voltage applied to said tube by said supply.

13. A document scanner according to claim 11 in which said detector comprises a plurality of photomultiplier tubes responsive to light of different colors, each connected to a voltage supply whose output voltage is controllable in response to inputs applied thereto, and in which the means for adjusting said detector includes means for varying the voltage applied to each said tube by a corresponding voltage supply.

14. A document scanner according to claim 1 in which said signal processing circuitry further includes:
(1) logarithmic amplifying means,
(2) means for connecting said logarithmic amplifying means in circuit with signals applied to said signal processing circuitry,
(3) means for applying to said signal processing circuitry internal reference signals of equal magnitude and opposite sign,
(4) means for repeatedly adjusting a first of said adjustment elements until the outputs provided by said circuitry in response to said equal-magnitude internal reference signals are substantially equal.

15. A document scanner according to claim 14 which further includes
(1) means for applying to said signal processing circuitry internal reference signals of at least three different magnitudes,
(2) means for repeatedly adjusting said first adjustment element until the differences in pairs of outputs provided by said circuitry in response to said different magnitude reference signals are substantially equal to the ratios of the magnitudes of corresponding pairs of said signals.

16. A document scanner according to claim 14 which includes
(1) third and fourth adjustment elements,
(2) means for supplying to said signal processing circuitry selected internal reference signals indicative of third and fourth reference output levels and driving said circuitry to third and fourth nominal output levels, respectively,
(3) means responsive to said nominal output levels for repeatedly varying said third and fourth adjustment elements until said circuitry provides said third and fourth reference output levels, respectively.

17. A document scanner according to claim 16 which further includes
(1) means for connecting said detector to said circuitry after said third and fourth adjustment elements have been adjusted,
(2) a first reference band for generating a first reference band output when said band is scanned with said detector,
(3) means for adjusting said first adjustment element to drive said first reference band output toward a first reference band reference output in response to scanning said first reference band,
(4) a second reference band for generating a second reference band output when said band is scanned with said detector,
(5) means for adding internal reference signals of equal magnitude and opposite sign to the output of said detector to form, with said detector output, augmented second reference band outputs,
(6) means responsive to said augmented reference band outputs for adjusting said second adjustment element to drive said augmented output toward a second reference band reference output in response to scanning said second reference band.

18. A self-calibrating document scanner providing both transmissive and reflective scanning, comprising
A. a detector for generating electric signals indicative of information in a document
B. signal processing circuitry connected to receive said detector signals as input and convert said signals to digital form as output for subsequent utilization, said circuitry including first and second adjustment elements for adjusting input-output transfer characteristics of said circuitry,
C. a transparent drum for mounting a document to be scanned,
D. first and second reference bands for generating first and second reference band outputs when scanned,
E. means for adjusting said adjustment elements in response to scanning said first and second reference bands, respectively, to drive said outputs to first and second reference band reference outputs, respectively.

19. A document scanner according to claim 18 in which said first reference band comprises a strip of highly light-reflective material positioned for reflection into said detector and backed by a strip of highly light-absorbant material postitioned to block transmission to said detector, said strip providing a reference band maximum signal when said scanner is operated in reflective mode, and providing a reference band minimum signal when said strip is operated in transmissive mode.

20. A document scanner according to claim 19 in which said second band comprises a longitudinally-extending area formed by the surface of said drum.

21. A document scanner according to claim 20 in which said first and second reference bands generate "white" and "black" reference level signals, respectively, when scanned in reflective mode, and generate "black" and "white" reference level signals, respectively, when scanned in transmissive mode.

22. A self-calibrating document scanner providing line-by-line calibration correction, comprising
A. a detector for generating electric signals indicative of information in a document,
B. signal processing circuitry connected to receive said detector signals as input and convert said signals to digital form as output for subsequent utilization, said circuitry including first and second adjustment elements for adjusting input-output transfer characteristics of said circuitry, C. means for setting each said adjustment element to a reference setting prior to line-by-line scanning of a document, D. first and second reference bands, corresponding to the respective first and second adjustment elements, for generating first and second reference band outputs when said bands are scanned with said detector, E. means for determining, for each adjustment element, a sensitivity factor comprising the ratio of a change in output on successive readings of a corresponding reference band responsive to a change in the corresponding adjustment element from the reference setting of that element, F. means for adjusting, during the scanning of a document, each adjustment element by an amount equal to the product of the sensitivity of said element and the difference between the output corresponding to a reference setting of said adjustment element and the corresponding reference band output during scanning of a line.

23. A document scanner according to claim 22 which further includes means for adding to the detector output corresponding to scanning a second band, prior to determining the sensitivity of said first adjustment element, an internal reference signal providing a reference output corresponding to a defined setting of said second adjustment element.

24. A method of calibrating a document scanner having a detector for generating electric signals indicative of information in a document being scanned and having signal processing circuitry adjustable in gain and offset, comprising the steps of:

(1) applying first and second internal reference signals to said circuitry in the absence of a signal from said detector, (2) examining the outputs generated in response to said signals and adjusting the gain and offset of said circuitry to obtain first and second reference outputs, respectively, (3) scanning first and second reference elements with said detectors and examining the outputs in response thereto, (4) readjusting said first and second reference elements to reobtain said first and second reference outputs.

25. The method of claim 24 in which said first reference element adjusts the gain of said circuitry.

26. The method of claim 25 in which said second reference element adjusts the offset of said circuitry.

27. The method of claim 26 which includes the step of adding an internal offset signal to the output of said detector prior to at least one of said adjustments.

28. The method of claim 27 which includes the step of adding alternate internal reference signals of equal magnitude and opposite sign to the output of said detector prior to at least one of said adjustments to generate augmented outputs in response thereto, and adjusting said second reference element until said augmented output are equal.

* * * * *